United States Patent
Yager et al.

(10) Patent No.: US 7,787,363 B2
(45) Date of Patent: Aug. 31, 2010

(54) DUAL-PURPOSE UPLINKS USED IN A FAULT-TOLERANT STACK

(75) Inventors: Charles T. Yager, Cupertino, CA (US); James W. Edwards, III, Austin, TX (US); Craig A. Zimmerman, Austin, TX (US); Gurinderjit Chahal, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 1212 days.

(21) Appl. No.: 11/040,769

(22) Filed: Jan. 21, 2005

(65) Prior Publication Data

US 2006/0186926 A1    Aug. 24, 2006

(51) Int. Cl.
*G01R 31/08* (2006.01)

(52) U.S. Cl. .................. 370/219; 370/244; 370/388

(58) Field of Classification Search ......... 370/216–228, 370/241–250, 386–388; 709/208–209, 220–222; 711/112
See application file for complete search history.

(56) References Cited

U.S. PATENT DOCUMENTS

| | | | |
|---|---|---|---|
| 6,793,539 B1* | 9/2004 | Lee et al. ............... | 439/701 |
| 7,319,664 B2* | 1/2008 | Chen et al. ............. | 370/217 |
| 7,516,272 B2* | 4/2009 | Felton et al. ........... | 711/112 |
| 2003/0179711 A1* | 9/2003 | Huff ........................ | 370/248 |
| 2006/0092827 A1* | 5/2006 | Jain ......................... | 370/216 |
| 2006/0146697 A1* | 7/2006 | Magret et al. .......... | 370/219 |

FOREIGN PATENT DOCUMENTS

| GB | A-2 028 062 | 2/1980 |
|---|---|---|
| GB | A-2 350 530 | 11/2000 |
| WO | WO 96/41433 A | 12/1996 |

OTHER PUBLICATIONS

Marvell Semiconductor, Inc., Alaska Single-Port Gigabit Ethernet Transceiver 88E1111, Nov. 2002, copyright 2002 Marvell International Ltd., Sunnyvale, CA.

* cited by examiner

*Primary Examiner*—Aung S Moe
*Assistant Examiner*—Vinncelas Louis
(74) *Attorney, Agent, or Firm*—Charles Krueger

(57) ABSTRACT

A fault-tolerant stack of low cost switches each having only two dual-purpose uplinks is enabled by utilizing a specified topology for connecting the uplinks and implementing a recovery algorithm on each switch.

6 Claims, 20 Drawing Sheets

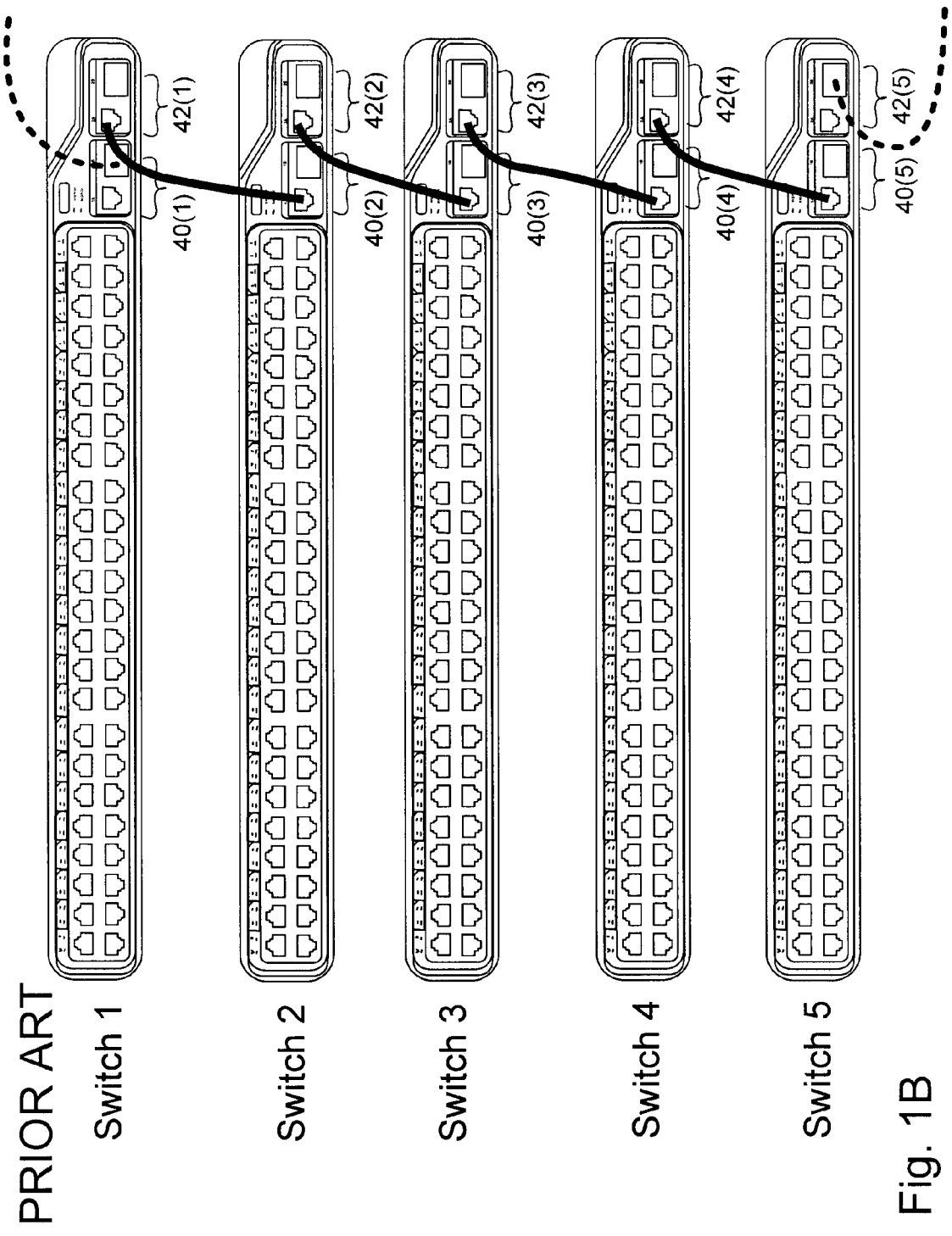

DUAL-PURPOSE UPLINKS USED IN A FAULT-TOLERANT STACK

BACKGROUND OF THE INVENTION

Fault Tolerant stacking is desirable to customers because it increases network availability. For example, low-cost Ethernet 10/100 Switches are sometimes stacked in a wiring closet as a low cost solution. However all of the fault tolerant stacking designs to date employ two active ports on every switch to create a loop plus an additional one or two active ports for uplinks. Low-cost Ethernet 10/100 switches only have two uplink ports. One of the uplink ports on the top and the bottom of the stack are used for fiber or copper connections, therefore they are not available for creating a fault tolerant stacking loop with uplinks.

A fault-tolerant stack requires that a loop be created. FIG. 1A depicts an existing topology for such a stack comprised of switches having first and second uplink ports 40 and 42. Note that the second uplink port 42 of the bottom switch is connected to first uplink port 40 of the top switch to form a loop. If one of the switches fails then signals can be routed around the failed switch using the loop. Note however that because both uplink ports of each switch are used to form the fault-tolerant stacking topology there are no uplink ports available to form an uplink with the next level in the network hierarchy.

FIG. 1B depicts the same stack having fault-tolerant fiber uplinks to the next level of the network hierarchy. Since one port of the top and bottom switches are used to form the uplink to the next level these ports are not available to form a fault-tolerant loop within the stack.

The challenges in the field of stacking low-cost Ethernet switches continue to increase with demands for more and better techniques having greater flexibility and adaptability. Therefore, a need has arisen for a new system and method for providing low-cost, fault-tolerant solutions.

BRIEF SUMMARY OF THE INVENTION

In one embodiment of the invention, a fault tolerant stack is formed of low-cost switches each having only two dual purpose uplink ports.

In another embodiment of the invention, the dual purpose uplink ports low-cost switches in a stack are coupled according to a specified topology. Control software implements an algorithm for reconfiguring the topology if a link is lost or a switch is removed from the stack.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The invention will now be described, by way of example, not limitation, with reference to various embodiments implemented as stacked switches. However, the switch is a type of network device and the invention applies to stacks that include any type of network device such as a router, bridge, switch, layer 2 or layer 3 switch, gateway, etc., that is utilized to implement connectivity within a network or between networks.

Figure 1A:
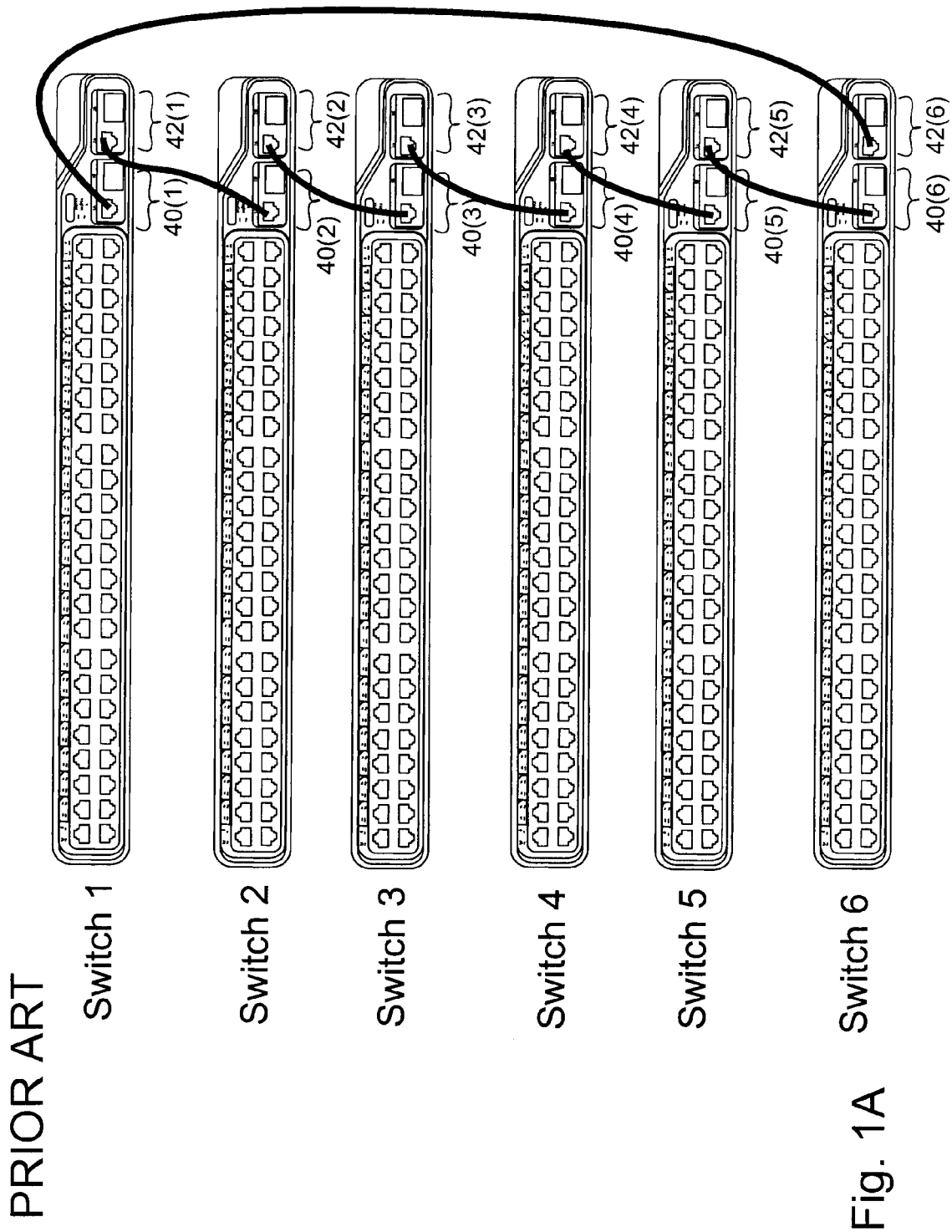
FIGS. 1A and B are diagrams depicting standard stacking topologies.
Figure 2:
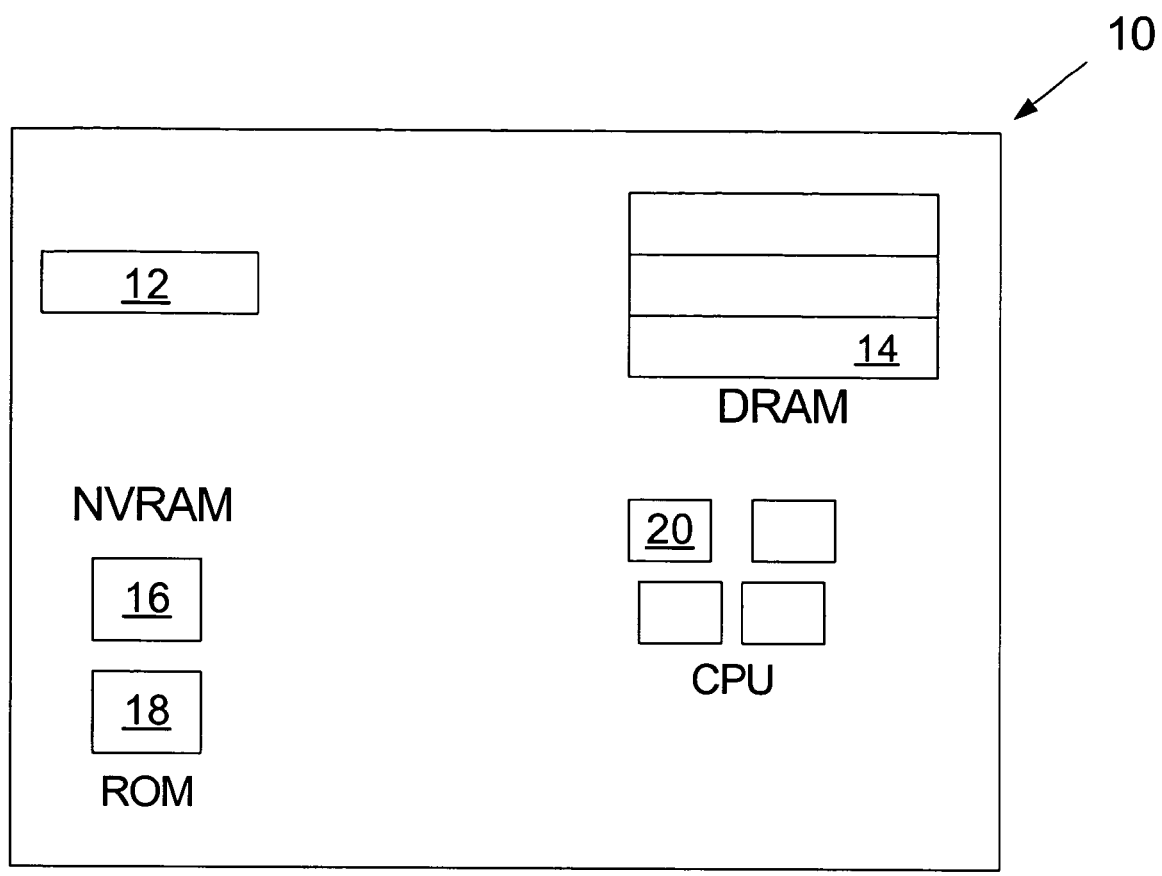
FIG. 2 is a block diagram depicting components of a motherboard included on a network device.

FIG. 2 depicts an example of a switch including a motherboard 10 having shared DRAM 12, DRAM 14, NVRAM 16, ROM 18 and a CPU 20. (Other components on the motherboard not relevant to the present description are not depicted). The DRAM 14 is the working storage utilized by the CPU and the shared DRAM 12 is dedicated to handling the switch's packet buffer. The NVRAM (non-volatile RAM) is used to store the switch's configuration file and also includes flash memory for storing an image of the IOS® (Internetworking Operating System). The ROM 18 holds a boot-start program which holds a minimum configuration state needed to start the switch. Alternatively, other configurations of the motherboard can be used. For example, the motherboard may not have separate ROM or NVRAM and the configuration file and IOS® image may be stored and executed out of flash memory.

An embodiment will now be described that utilizes low-cost Ethernet 10/100 switches having two uplink ports. Each uplink port is Media Detect PHY (Physical Layer Device) that is a single transceiver having two associated physical connectors, where only one of the physical connectors associated with the transceiver may be active at a time. In this embodiment one physical connector connects to a fiber cable and the other physical connector connects to a copper cable. The Media Detect PHY may be configured with one of its physical connectors as the default physical connector. If the default connector fails to achieve a link then the PHY starts polling both physical connectors to achieve the link.

In this embodiment of the invention, a cabling topology connecting the physical connectors of the Media Detect PHYs of a group of stacked low-cost Ethernet 10/100 switches is utilized in combination with a software algorithm to achieve a fault tolerant stack.

Figure 3:
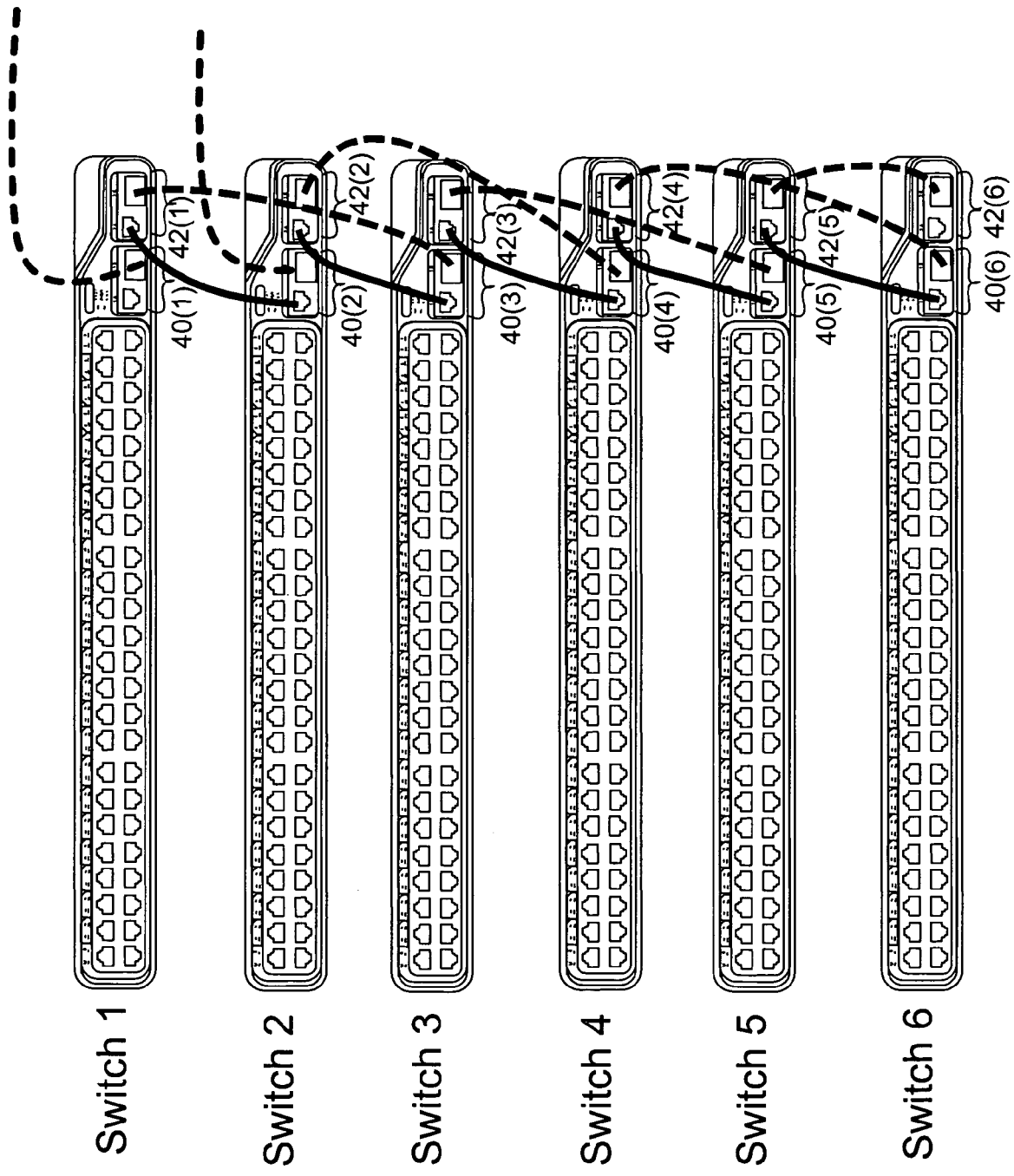
FIG. 3 depicts an embodiment of the stacking topology.

FIG. 3 depicts the cabling topology for a fault-tolerant stack having dual fault-tolerant uplinks to the next network level. In the following drawings a copper link is indicated by a solid line and a fiber link is indicated by a broken line.

The stack is formed of an ordered set of interconnected switches S(X) where X is an integer having a value between 1 and N where N is the number of switches in the stack. In FIG. 3, N=6. The stack has an uplink end pair of switches S(1) and S(2) and a non-uplink end pair of switches S(N) and S(N−1) and any number if interior switches.

Each switch has a first port 40(X) and a second port 42(X) with each port having a copper connector and fiber connector.

In general, there are N switches in the stack, with each stack identified by an integer X where X is 1, . . . , N. The uplink pair of switches are S(1) and S(2) and the non-uplink pair of switches are switches S(N) and switch S(N−1).

For each interior switch, S(X) the connection topology is the same, where X<N and not equal to either 1, 2, N−1, or N. The copper connector of the first port of S(X) is coupled to the copper connector of the second port of S(X−1); the fiber connector of the first port of S(X) is coupled to the fiber connector of the second port of S(X−2); the copper connector of the second port of S(X) is coupled to the copper connector of the first port of S(X+1); and, the fiber connector of the second port of S(X) is coupled to the fiber connector of the first port of S(X+2).

For example, in FIG. 3 the fourth switch S(4) depicts the connection topology of an interior switch. The copper connector of the first port 40(4) is connected to the copper connector of the second port 42(3) of the third switch S(3); the fiber connector of the first port 40(4) is connected to the fiber connector of the second port 42(2) of the second switch S(2); the copper connector of the second port 42(4) is connected to the copper connector of the first port 40(5) of the fifth switch S(5); and, the fiber connector of the second port 42(4) is connected to the fiber connector of the first port 40(6) of the sixth switch S(6).

As described above, the first and second switches S(1) and S(2) on the uplink end of the stack are connected using a different topology.

Turning now to the first switch S(1), the copper connector of the first port 40(1) is not connected and the fiber connector of the first port 40(1) is used as the uplink connection to the next layer. The second port of the first switch S(1) is connected in the same way as an interior switch.

Turning now to the second switch S(2), the copper connector of the first port 40(2) is connected to the copper connector of the second port 42(1) of the first switch and the fiber connector of the first port 40(2) is used as the uplink connection to the next layer. The second port of the second switch S(2) is connected in the same way as an interior switch.

Further, the two switches on the non-uplink side of the stack, in FIG. 3 the fifth and sixth switches S(5) and S(6) are connected using a different topology.

Turning first to the fifth switch S(5), the first port 40(5) is connected in the same way as an interior switch. The copper connector of the second port 42(5) is connected to the copper connector of the first port 40(6) of the sixth switch S(6) and the fiber connector of the second port 42(5) is connected to the fiber connector of the second port 42(6) of the sixth switch S(6).

Turning now to the sixth switch S(6), the first port 40(6) is connected in the same as an interior switch. The copper connector of the second port 42(6) is not connected and the fiber connector of the second port 42(6) is connected to the fiber connector of second port 42(5) of the fifth switch S(5).

A software algorithm will now be described that allows the formation of a fault-tolerant stack with redundant uplinks for a stack connected utilizing the topology depicted in FIG. 3 and described above.

The Media Detect PHYs, described above, are standard parts and not part of the invention. Each of these PHY may be defaulted to connect to either the copper or fiber connection. If a Media Detect PHY loses a link on one of its connections it automatically switches to the other connection.

Control software executed by the switch, for example IOS® manufactured by the assignee of the present application, utilizes a management interface on a PHY ASIC (Application Specific Integrated Circuit) to control and configure the PHY. For example, the PHY may include configuration registers that are written by control software to configure such attributes as the Port Speed, the physical connector utilized to transmit and receive, reset, and so on, and the control registers are read by control software to determine the current configuration of the PHY.

Figure 4:
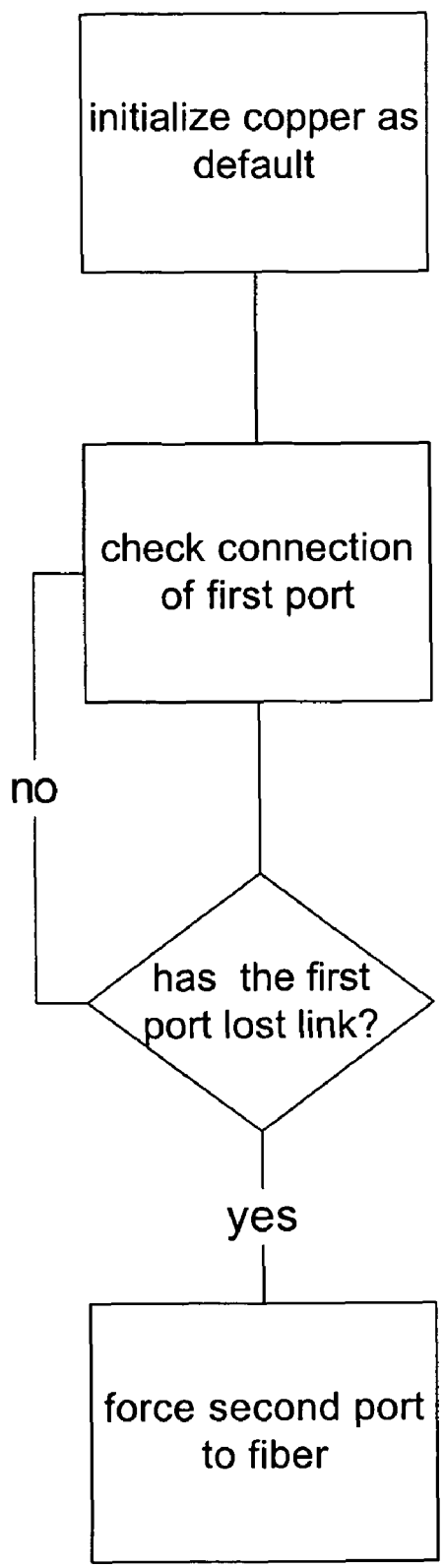
FIG. 4 is a flow chart depicting the embodiment of reconfiguration algorithm.

In this embodiment, as depicted in the flow chart of FIG. 4, the control software initializes the first and second uplink ports of a switch to default to the copper connector. If a switch looses link on the copper connector of the second port then the second port switches to the fiber connector. As described above, this is done automatically by the Media Detect PHY. In the event that the copper connector of the first port looses link then the first port switches to fiber and control software forces the second port to fiber.

The algorithm is symmetric and not limited to the particular fiber-copper connection scheme depicted in the figures. For example, if the ports connected as depicted in FIG. 3 except with the fiber and copper connections reversed then if the default were fiber the algorithim would operate as described to recover from the loss of a link.

A series of detailed examples will now be described showing how the above-described algorithm and connection topology provide a fault-tolerant stack.

Figure 5:
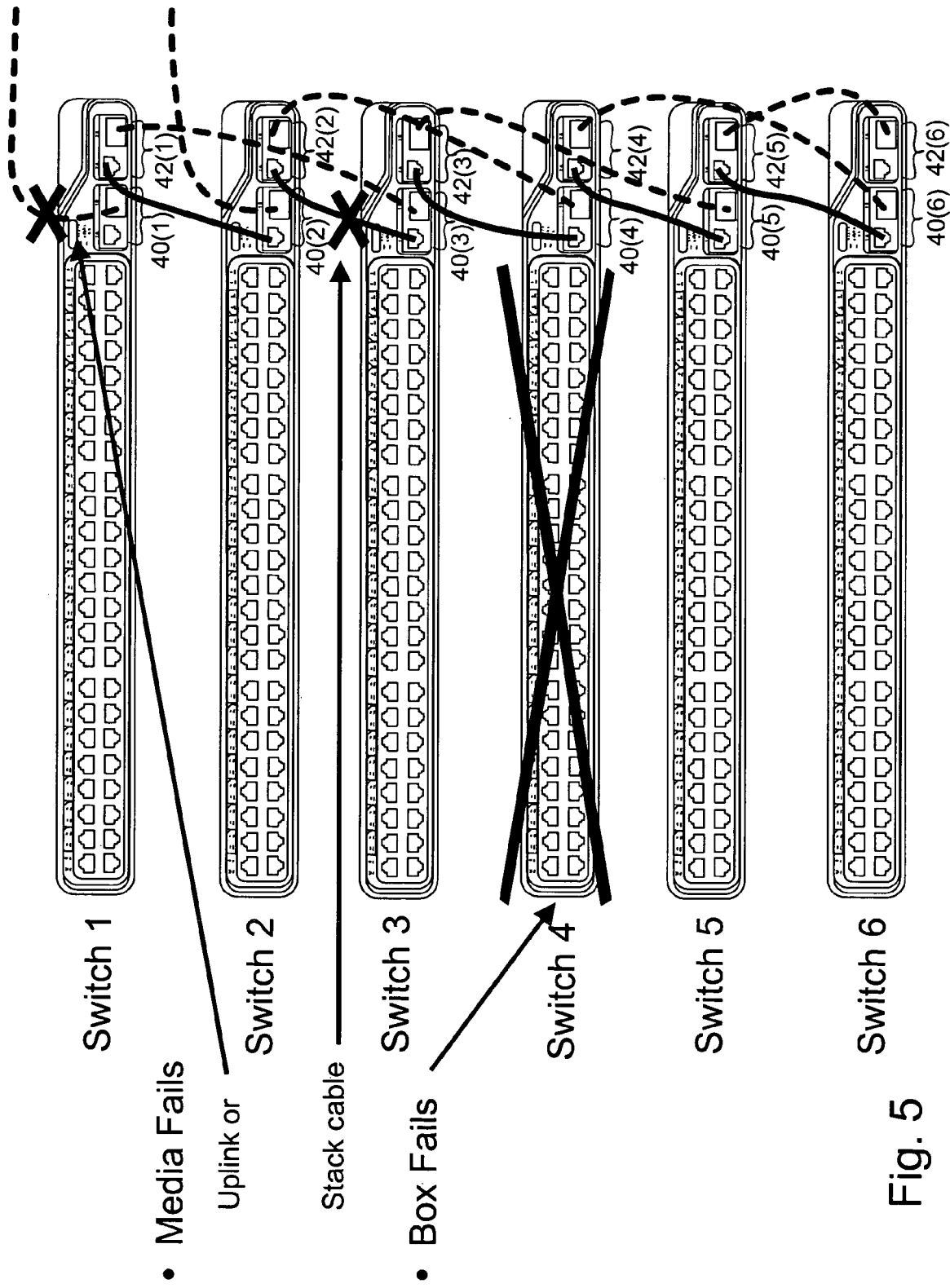
FIG. 5 is a diagram depicting types of faults that occur in a stack.

FIG. 5 depicts examples of faults to which the present embodiment is tolerant. In the following a fault is considered as the loss of a switch or a single link, where the link may be a stack link or an uplink. The algorithm does not require any special knowledge of the stack or other units in the stack.

As depicted in FIG. 5, the presently described embodiment provides recovery from both a media failure, i.e., failure of an uplink or stack interconnect, or from the failure of one of the switches in the stack.

Figure 6:
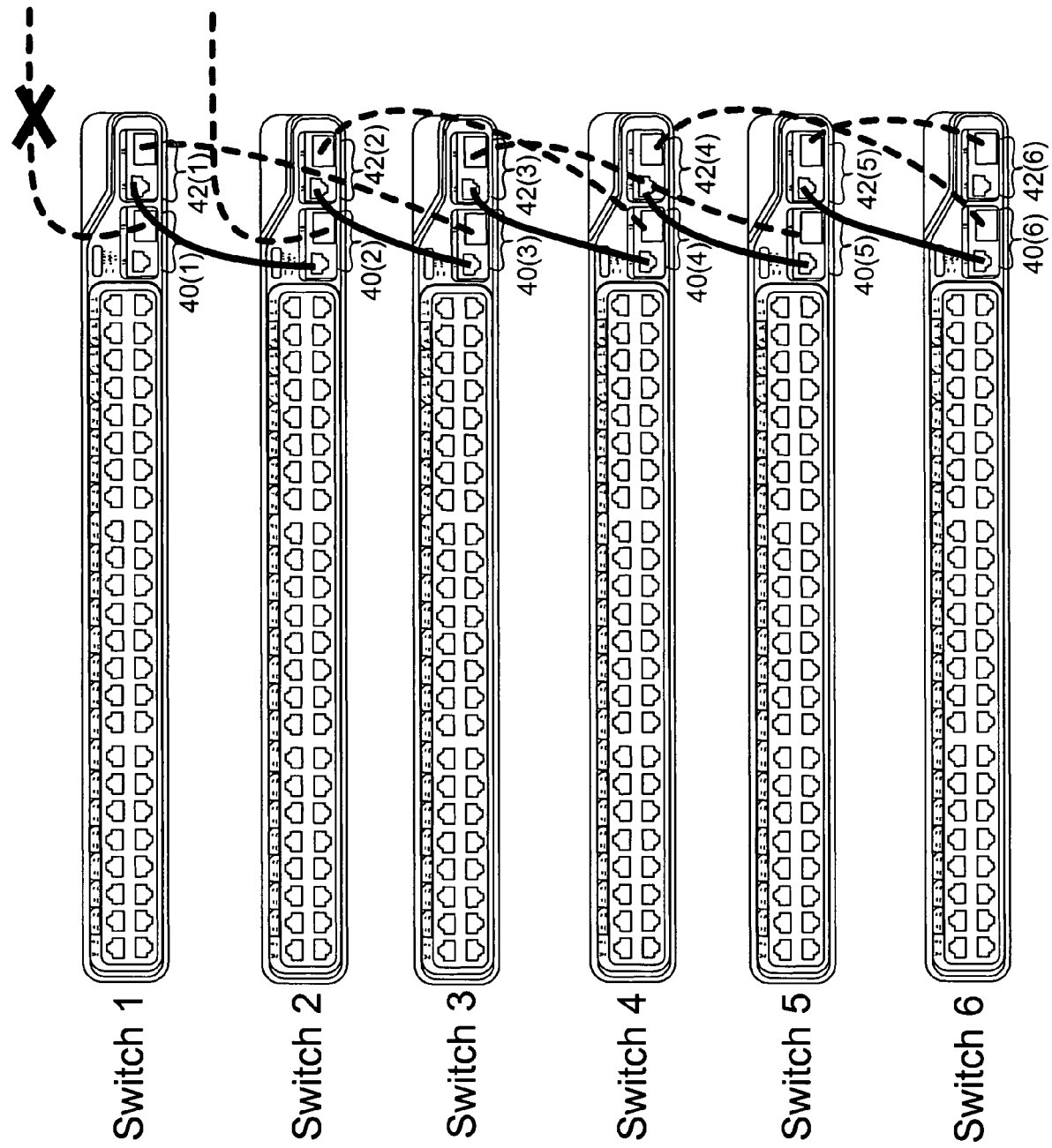
FIGS. 6-10 depict the operation of recovering from a primary uplink failure.
Figure 7:
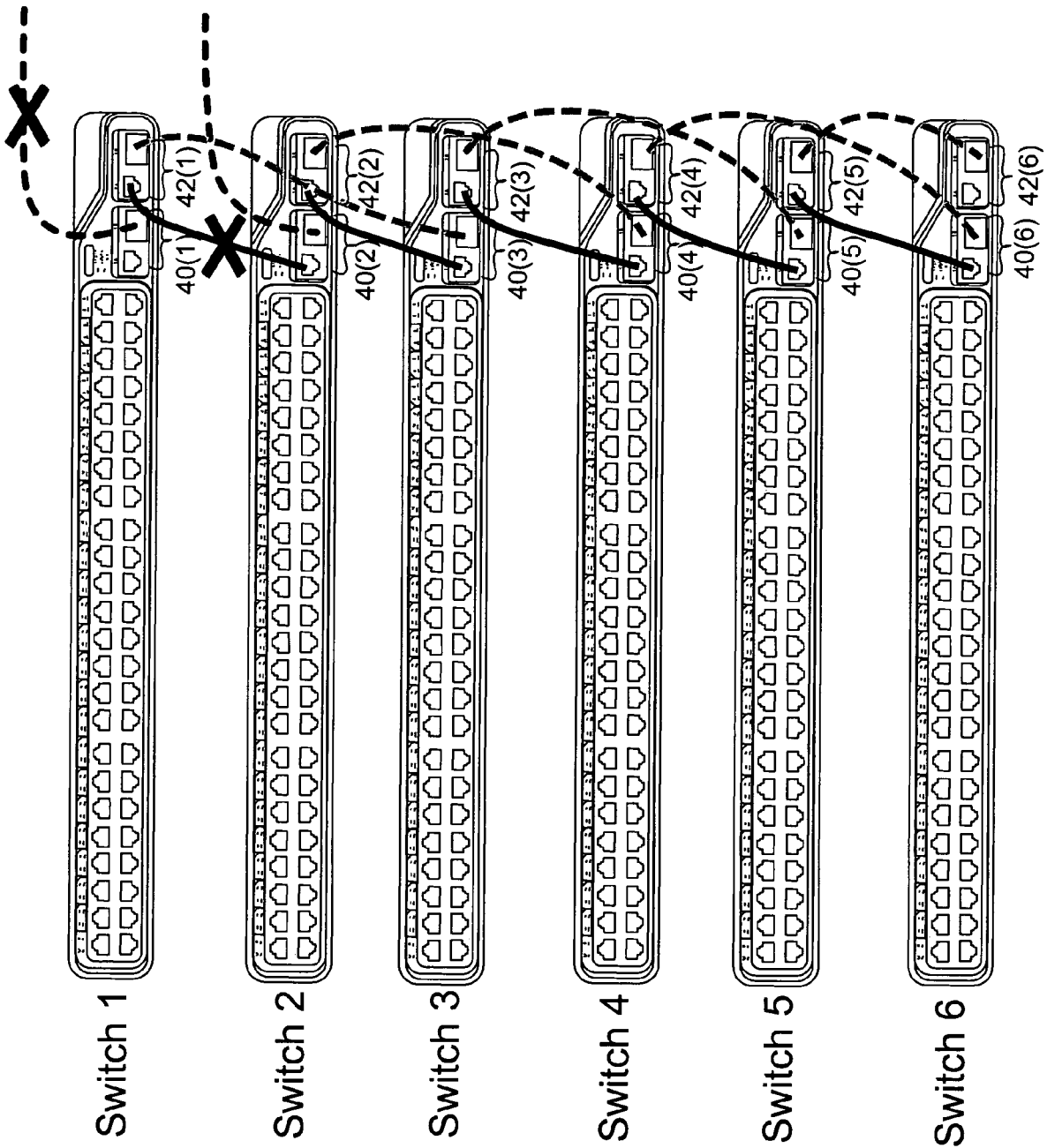

FIGS. 6-10 depict the operation of the presently described embodiment when recovering from a primary uplink media failure. In FIG. 6, the primary uplink is lost. As depicted in FIG. 7, when the primary uplink fails then port 1 of S(1) looses link and the control software forces port 2 of S(1) to switch to fiber.

The copper connector of port 1 of S(2) is connected to the copper connector of port 1 of S(1). Thus, when the control software switches port 2 of S(1) to fiber it causes port 1 of S(2) to loose link and automatically switch to fiber, thereby activating the secondary uplink. Also, when the control software detects that port 1 of S(2) has lost link it forces port 2 of S(2) to fiber.

Figure 8:
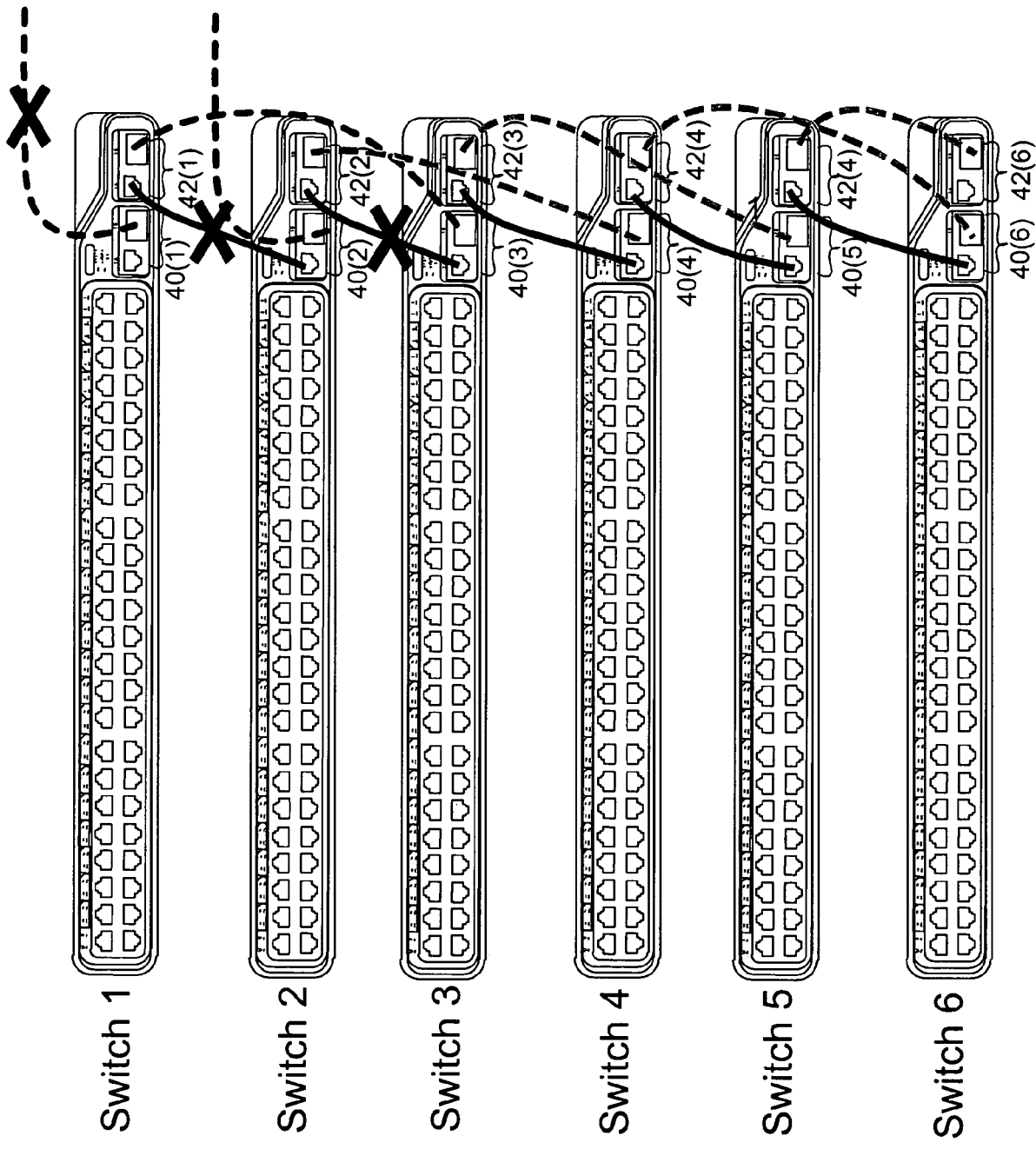
Figure 9:
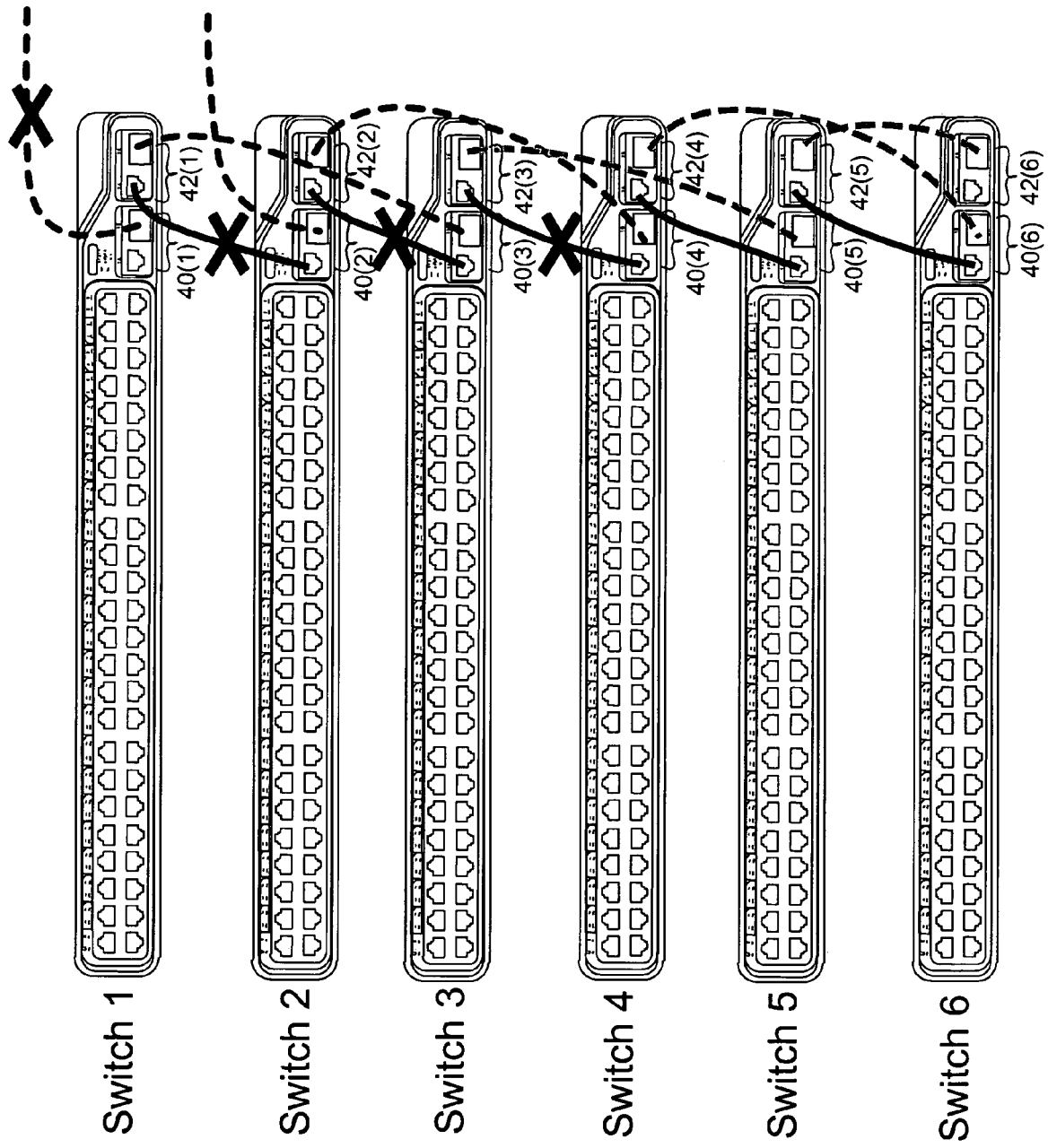
Figure 10:
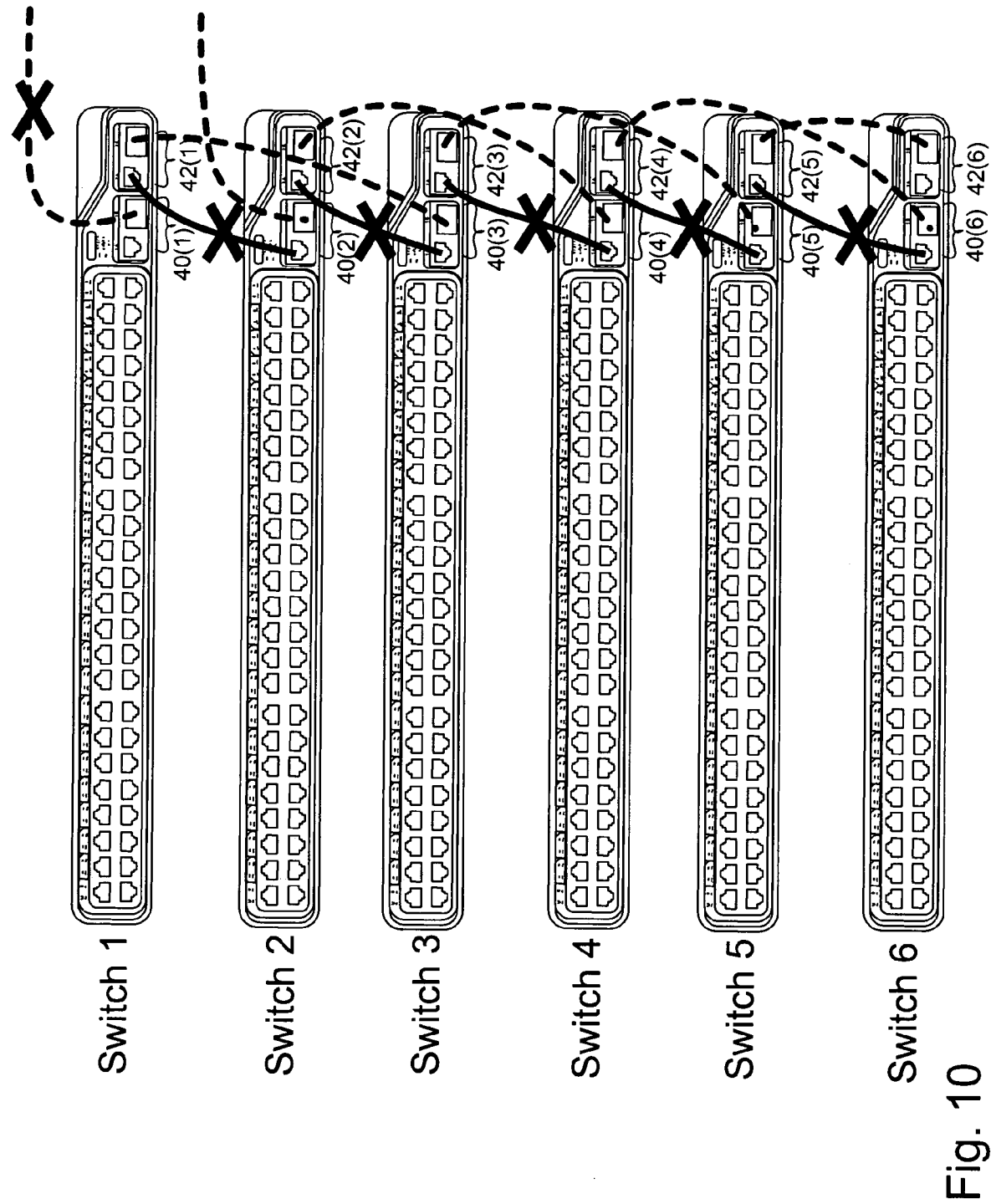

FIGS. 8-10 depict how the switching to the fiber connector cascades down the stack until the stack is reconfigured to recover from the loss of the primary uplink. All the remaining switches will see the same occurrence of the copper link on port 1 going down, automatically switching port 1 to fiber, and forcing port 2 to fiber. As depicted in FIG. 10, upon completion of the reconfiguration, port 1 on S(2) is now the uplink and the stack is configured as S(2), S(4), S(6), S(5), S(3), S(1) using all fiber. No switch is orphaned and the stack is not segmented.

Figure 11:
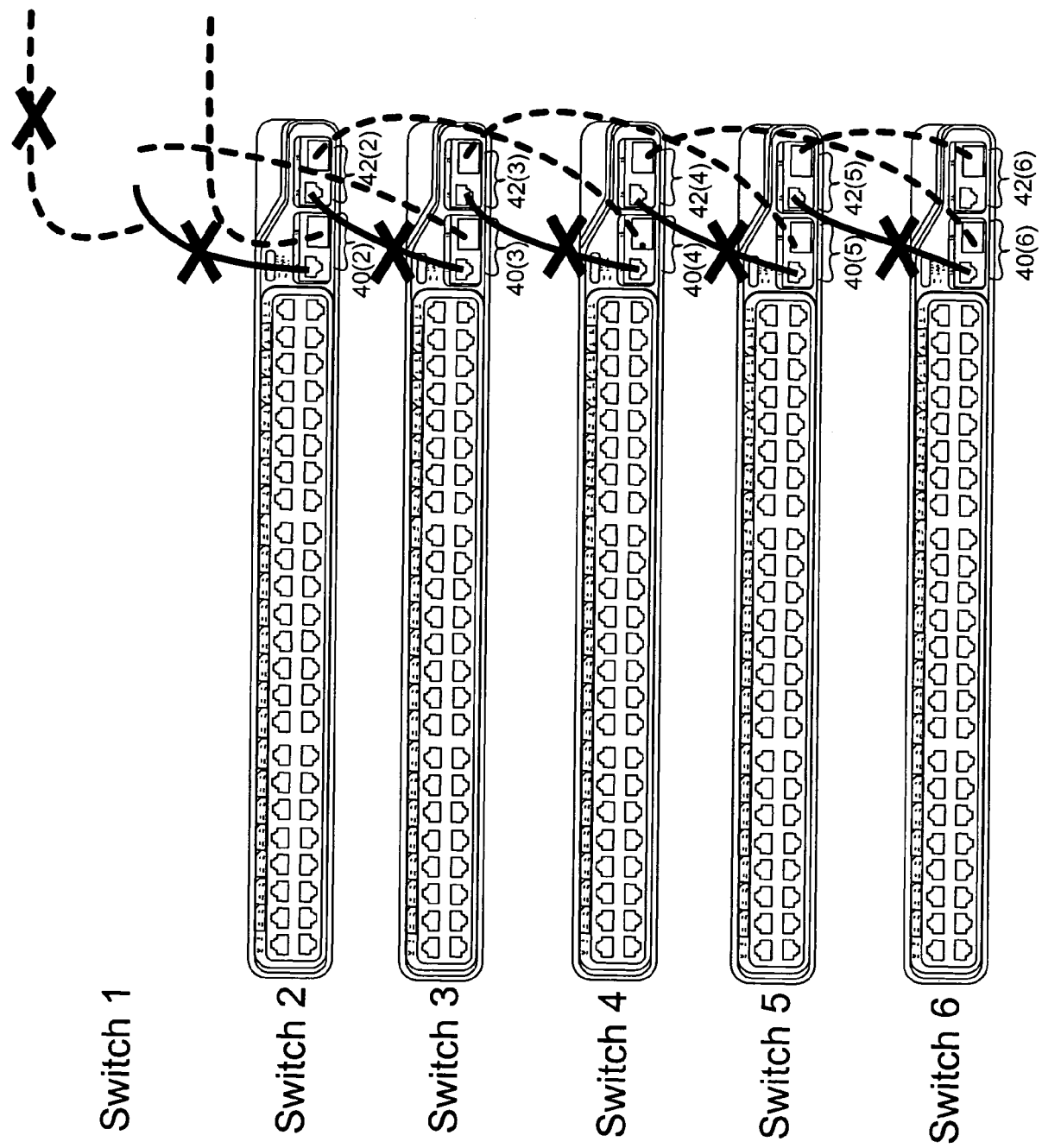
FIG. 11 depicts the operation of recovering from the loss of the first switch.

FIG. 11 depicts the operation of the embodiment when S(1) is lost due to some malfunction. As in FIG. 7, when S(1) is lost, port 1 of S(2) looses its link and automatically switches to fiber, thereby activating the secondary uplink. Also, when the control software detects that port 1 of S(2) has lost link it forces port 2 of S(2) to switch fiber. The remainder of the switches are then reconfigured so that the stack uses all fiber as described above with reference to FIGS. 6-10. The stack is reconfigured as S(2), S(4), S(6), S(5), S(3) using all fiber. No active switch is orphaned and the stack is not segmented.

Figure 12:
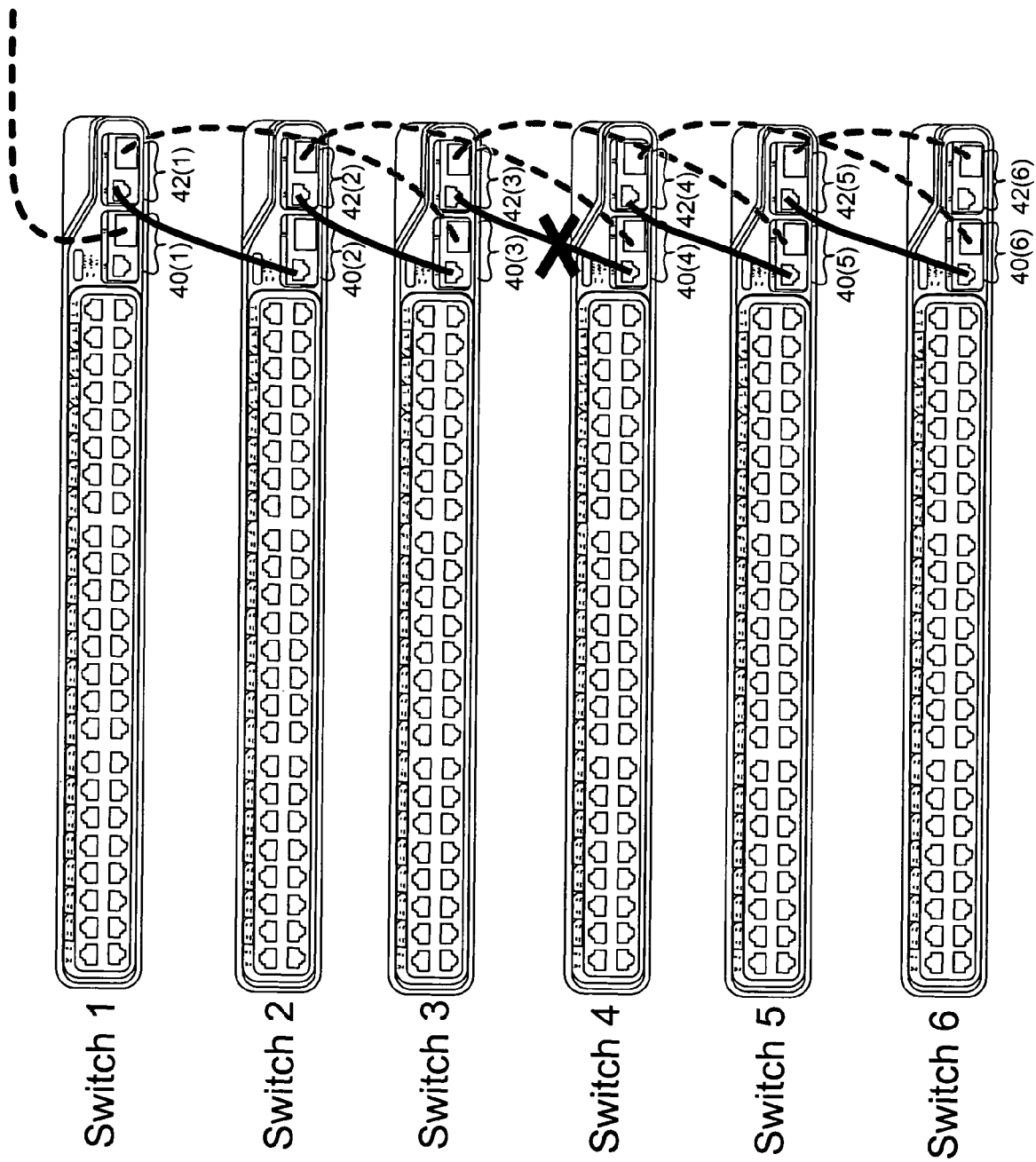
FIGS. 12-14 depict the operation of recovering from the loss of a single cable in the stack.
Figure 13:
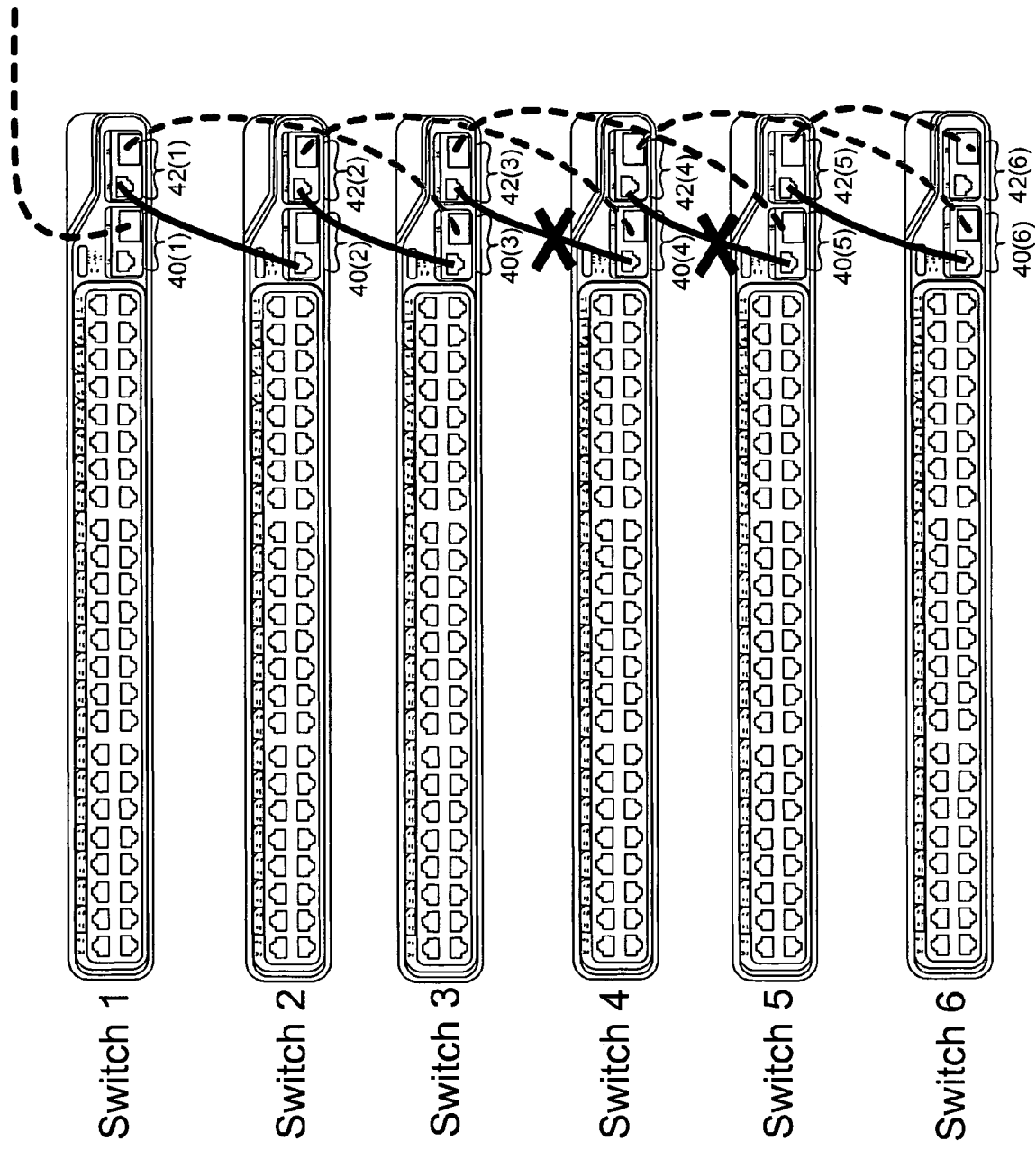
Figure 14:
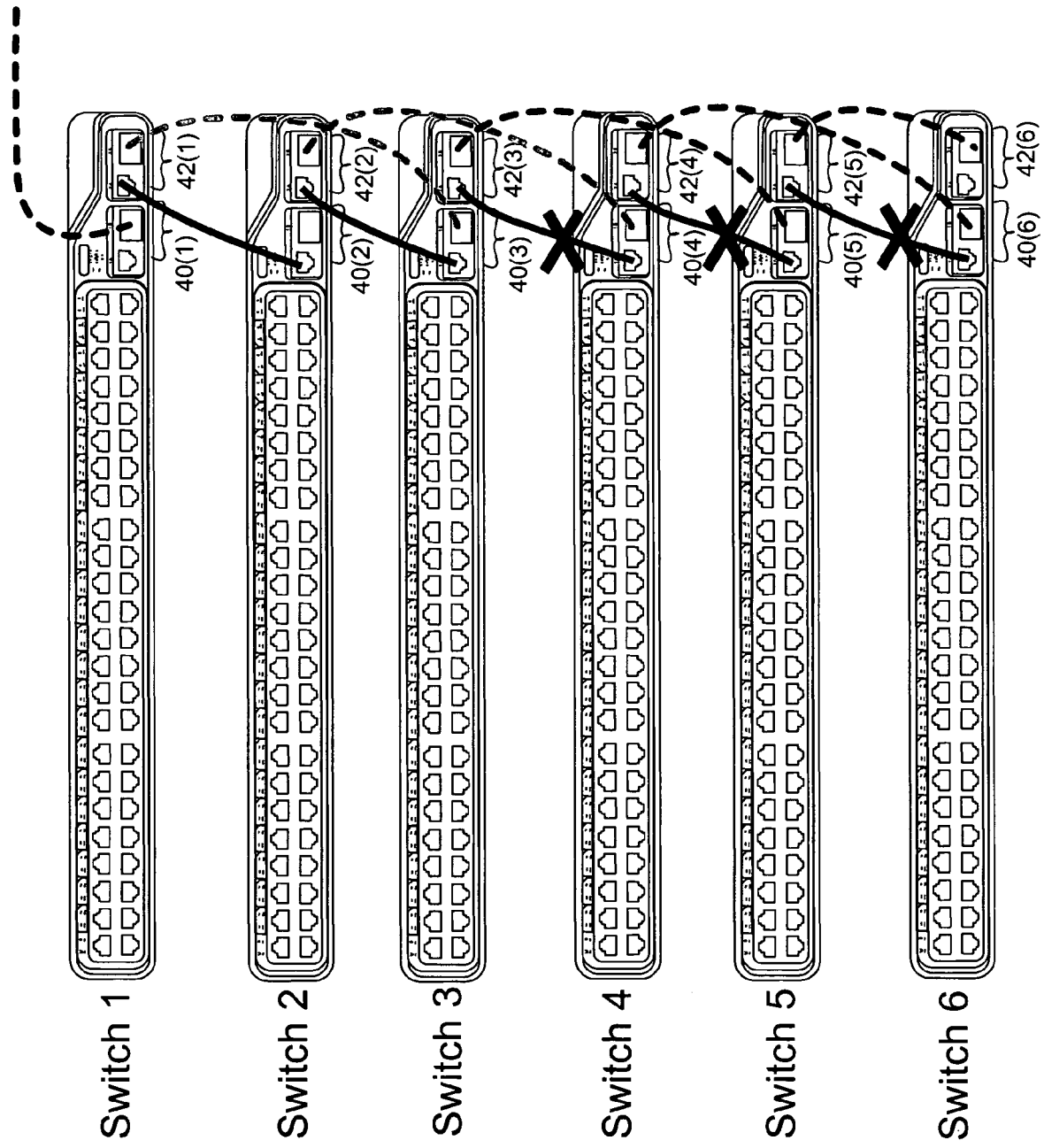

The recovery from the loss of a single cable in the stack is depicted in FIGS. 12-14. In this example the copper cable connecting the copper connector of port 2 of S(3) to the copper connector of port 1 of S(4) has failed.

S(3) loses the link on copper port 2 and switches to fiber on port 2 automatically. Simultaneously, S(4) loses its link on Copper port 1, switches to Fiber on port 1, and then the control software forces port 2 out of Preferred Media Mode (copper) and into fiber mode. This causes the copper link between S(4) and S(5) to go down and also causes the fiber link between S(3) and S(5) to come up.

S(4) loses its link on copper port 1 and switches to fiber on both port 1 and 2. This causes the copper link between S(4) and S(5) to go down and also causes the fiber link between S(3) and S(5) to come up.

Continuing down the stack, each switch forces port 2 to fiber port and the stack remains intact. The stack order has changed from S(1), S(2), S(3), S(4), S(5), S(6) to S(1), S(2), S(3), S(5), S(6), S(4). In this scenario, port 1 on S(4) is no longer used but it is at the end of the stack after the stack has stabilized.

Figure 15:
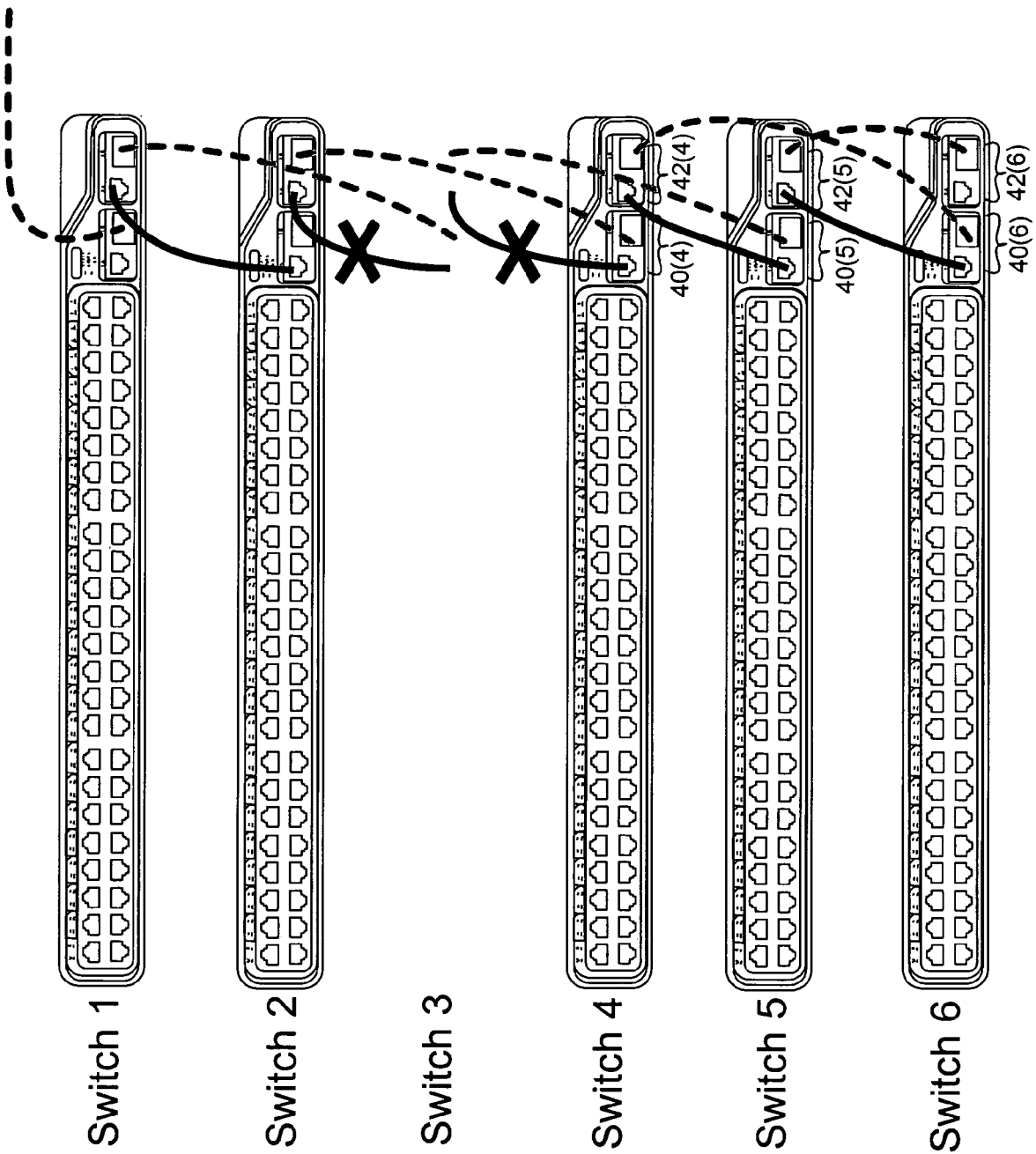
FIGS. 15-18 depict the operation of recovering from the loss a switch in the stack.
Figure 16:
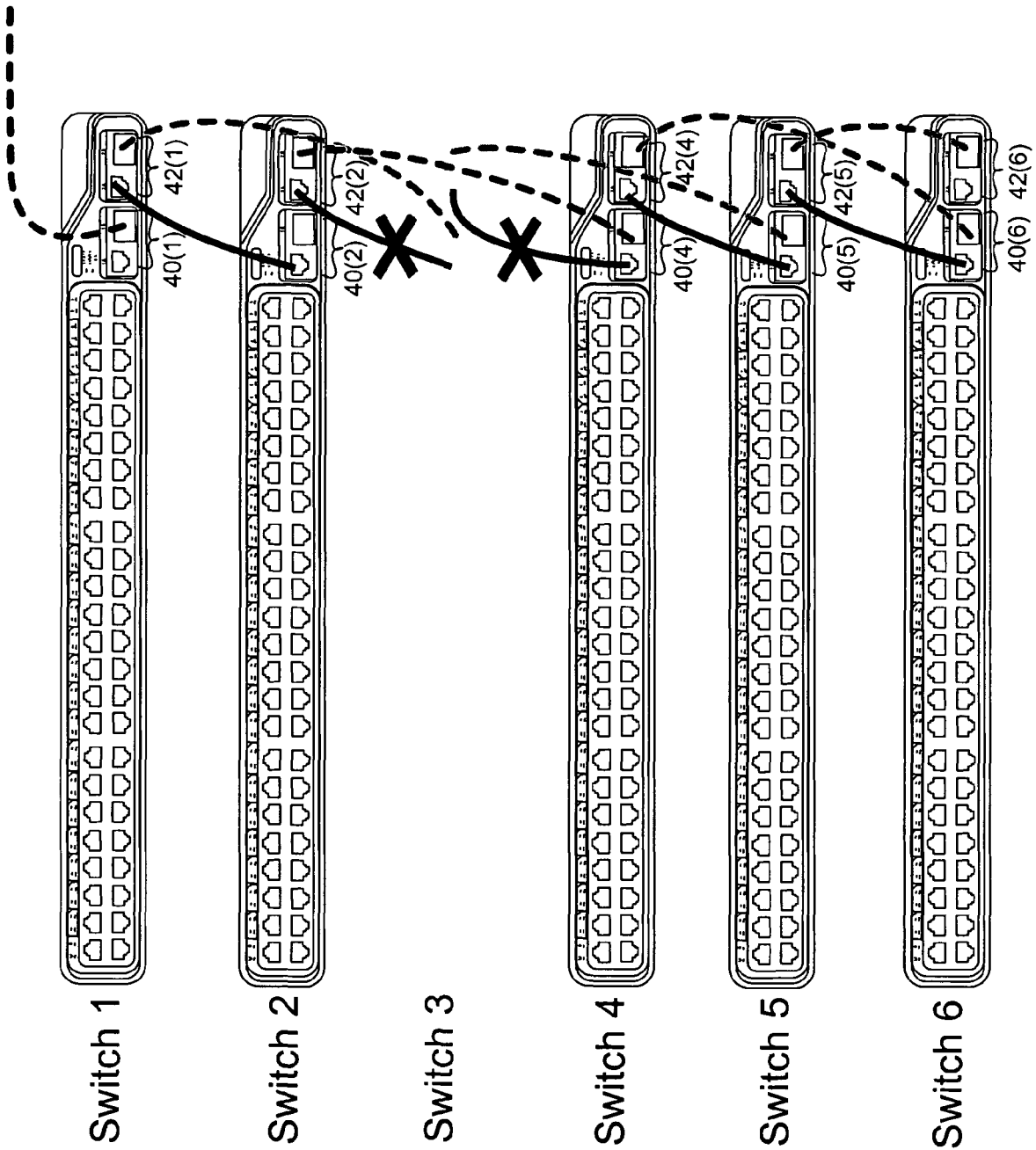
Figure 17:
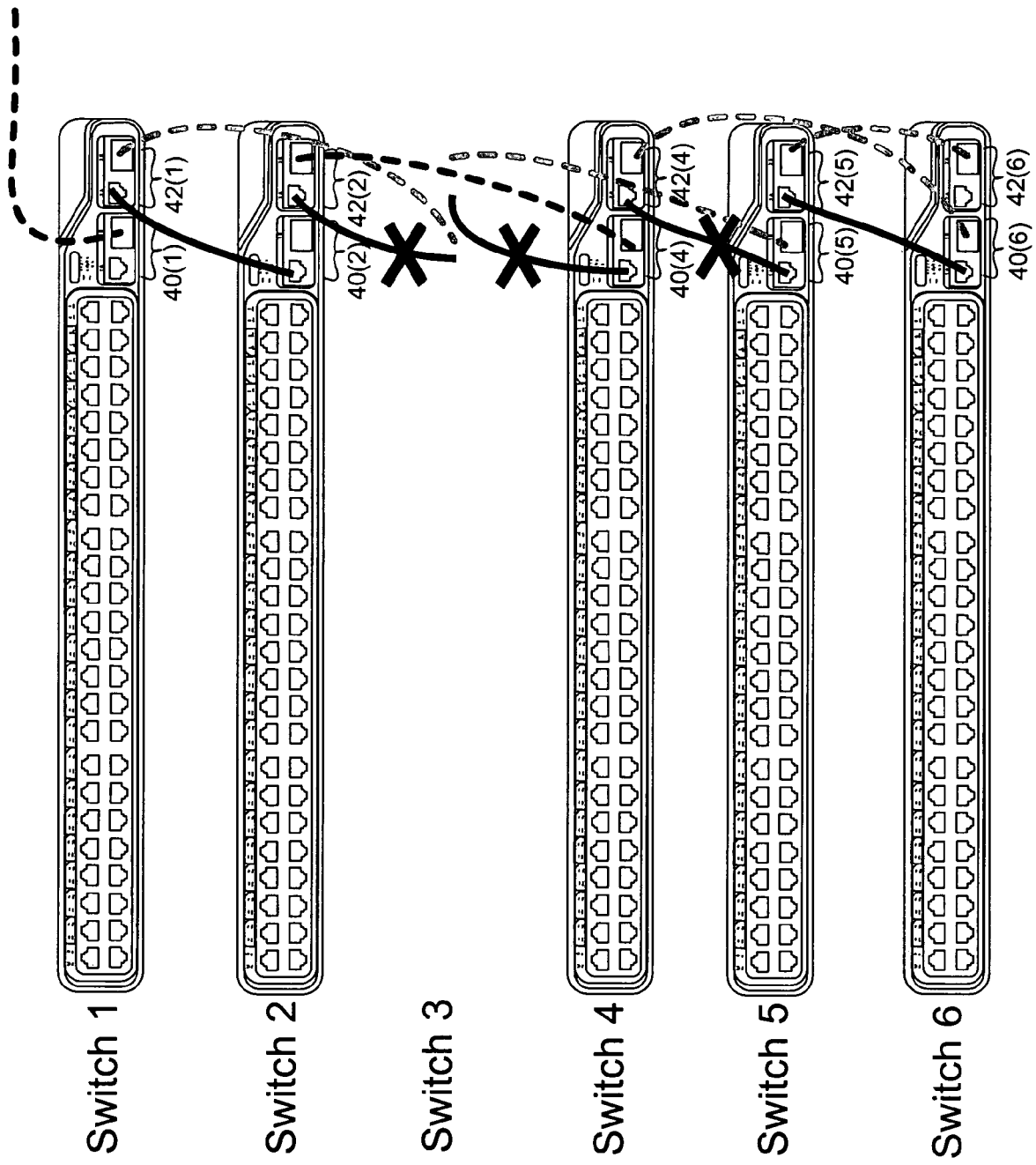
Figure 18:
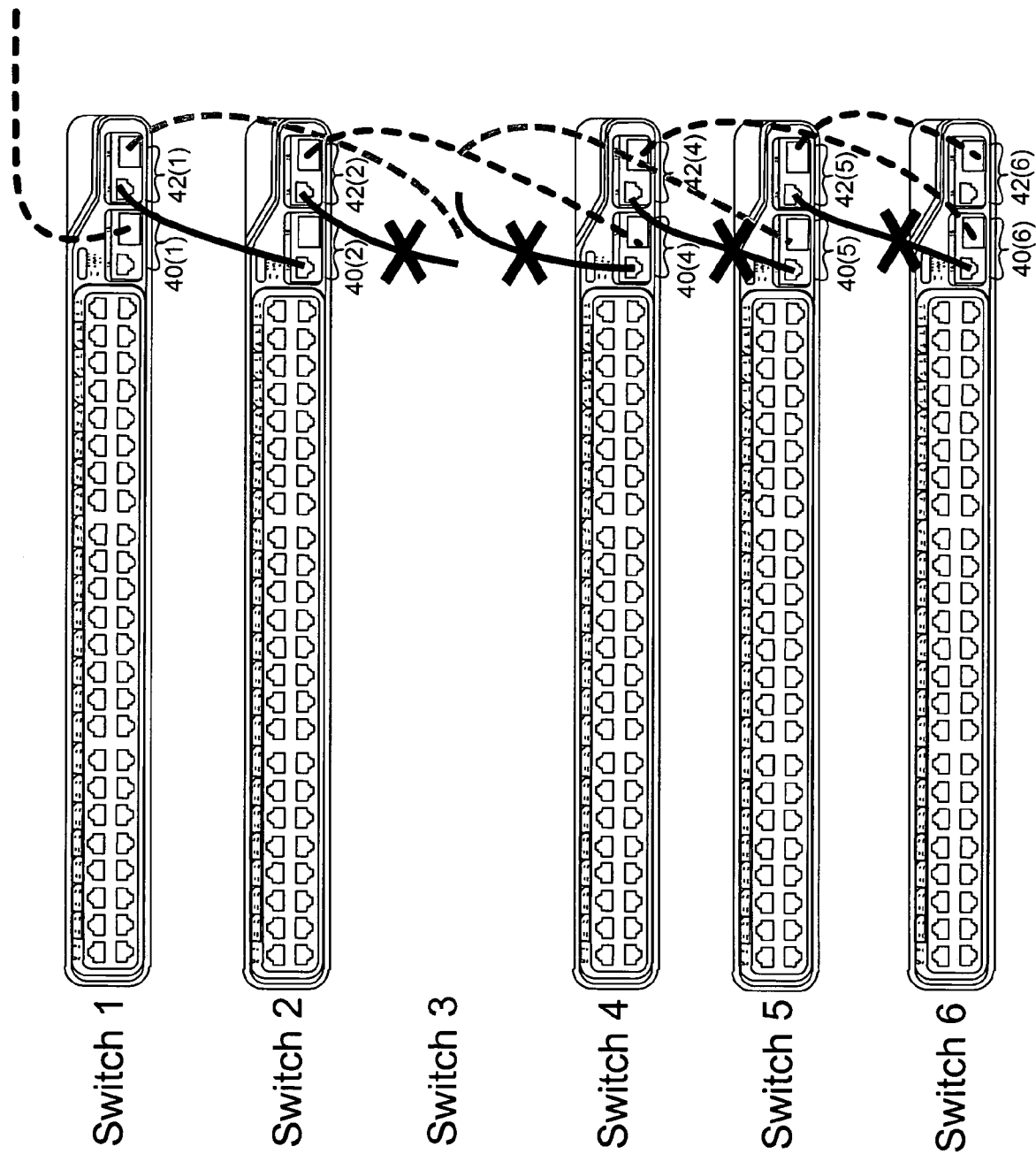

The recovery from the removal of a single switch in the stack is depicted in FIGS. 15-18. In FIG. 15, S(3) is removed from the stack.

Port 2 S(2) will change to fiber automatically. S(4) will lose copper on port 1, switch to fiber on port 1 automatically, and then control software forces port 2 to fiber. When S(4) forces port 2 to fiber it will cause the copper link between S(4) and S(5) to go down.

The algorithm will cause all the switches below the removed switch to switch to fiber and the stack remains in act. The stack is now configured as S(1), S(2), S(4), S(6), S(5).

Figure 19:
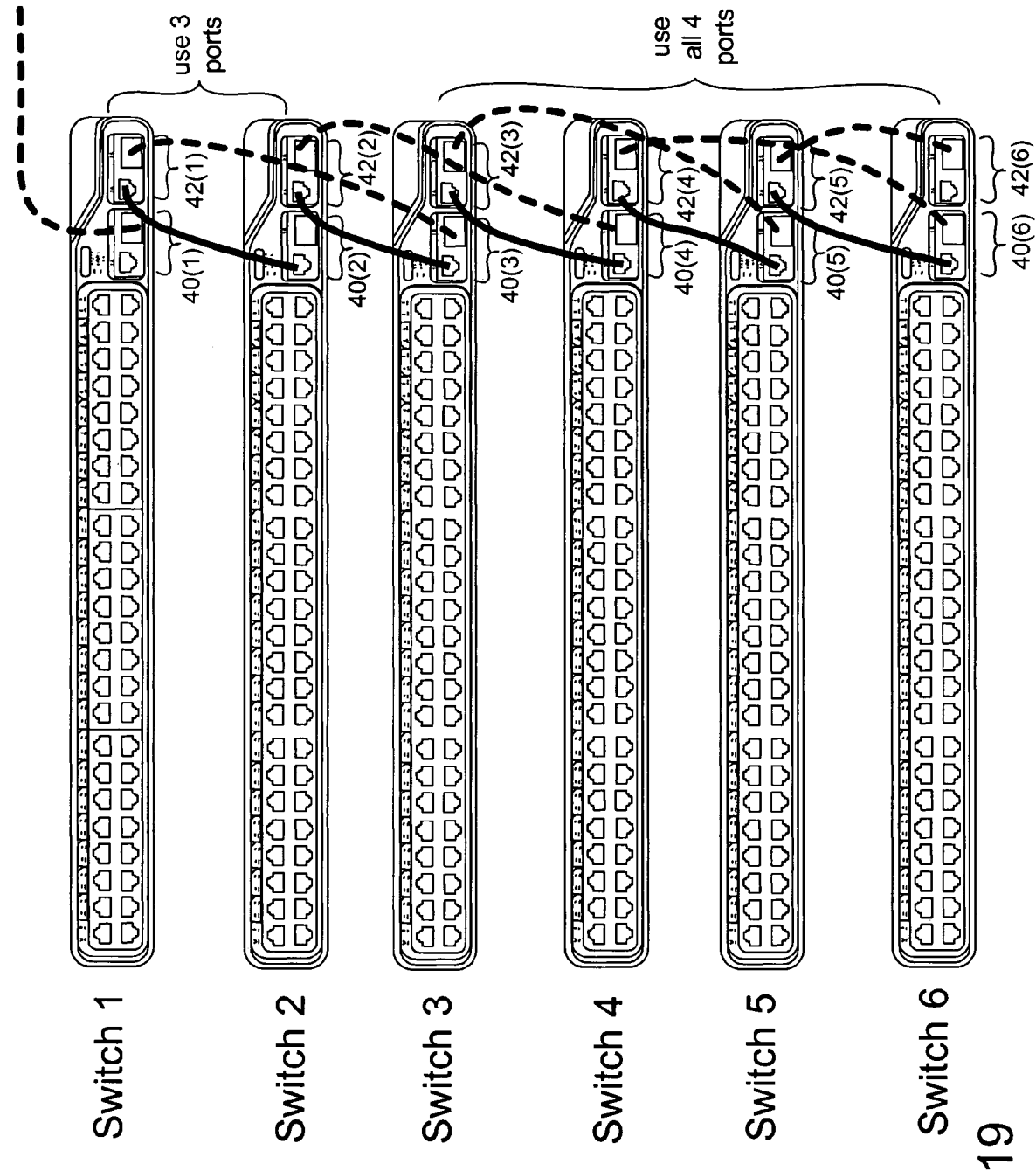
FIG. 19 depicts another embodiment of the stacking topology.

FIG. 19 depicts an alternative embodiment of the connection topology for a stack having only a single fiber uplink to the next network level. The topology is exactly the same as depicted in FIG. 3 except that the fiber connector of the first port S(2) is not connected. The recovery of the stack from a fault is the same as described above.

The invention may be implemented as program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. For example, although the embodiments have been described utilizing media such as copper and optical fiber to connect the ports, other types of connections such as radio frequency (RF) or infrared (IR) can be utilized as is understood by persons of skill in the art. Accordingly, it is not intended to limit the invention except as provided by the appended claims.

What is claimed is:

1. A fault-tolerant stack comprising:

a plurality of N network devices connected as a stack, where N is a positive integer and with each network device labeled S(X) where X is a positive integer having all values from 1 to N, with each network device having only first and second dual-purpose uplink ports being Media Detect PHYs having a single transceiver and first and second associated connectors where only one connector is active at a time, where;

in each interior network device of the stack, with each interior network device being one of the network devices, S(X), with X having only values greater than or equal to 3 and less than or equal to N−2, the first associated connector of the first dual-purpose uplink port of an interior network device is coupled to the first associated connector of the second dual-purpose uplink port of S(X−1), the second associated connector of the first dual-purpose uplink port of a-n said interior network device is coupled to the second associated connector of the second dual-purpose uplink port of S(X−2), the first associated connector of the second dual-purpose uplink port of a-n said interior network device is coupled to the first associated connector of the first dual-purpose uplink port of S(X+I), and, the second associated connector of the second dual-purpose uplink port of a-n said interior network device is coupled to the second associated connector of the first dual-purpose uplink port of S(X+2);

in a first network device S(1) of the stack the first associated connector of the first dual-purpose uplink port is not connected and the second associated connector of the first dual-purpose uplink port is used as an uplink connector to a next layer in a network hierarchy and the second dual-purpose uplink port of the first network device is connected in the same way the second dual-purpose uplink port of an interior network device;

in a second network device S(2) of the stack the first associated connector of the first dual-purpose uplink port is coupled to the first associated connector of the second dual-purpose uplink port of the first network device S(1), the second associated connector of the first dual-purpose uplink port is used as the uplink connector to the next layer in the network hierarchy, and the second dual-purpose uplink port of the second network device S(2) is connected in the same way as the second dual-purpose uplink port of an interior network device;

in a next to last network device S(N−1) of the stack the first dual-purpose uplink port is connected in the same way as the first dual-purpose uplink port of an interior network device, the first associated connector of the second dual-purpose uplink port is coupled to the first associated connector of the first dual-purpose uplink port of a last network device S(N) and the second associated connector of the second dual-purpose uplink port is coupled to the second associated connector of the second dual-purpose uplink port of the last network device S(N);

in the last network device S(N) of the stack, the first dual-purpose uplink port is connected in the same way as an interior network device, the first associated connector of the second dual-purpose uplink port is not connected, and the second associated connector of the second dual-purpose uplink port is coupled to the second associated connector of the second dual-purpose uplink port of the next to last network device S(N−1);

where each dual-purpose uplink port is configured with the first associated connector as default, and automatically switches to the second associated connector if a link to the first associated connector is lost; and where the first and second dual-purpose uplink ports of each network device are configured to force the second associated connector of the second dual-purpose uplink port to be active if the first associated connector of the first dual-purpose uplink port loses link.

2. The fault-tolerant stack of claim 1 where the first associated connector is coupled to a copper cable and the second associated connector is coupled to a fiber cable.

3. A system comprising:

for each interior network device included in a plurality of N network devices connected as a stack where N is a positive integer, with each network device labeled S(X), where X is a positive integer having all values from 1 to N and with each interior network device being one of the network devices, S(X), with X having only values greater than or equal to 3 and less than or equal to N−2, with each network device having only first and second dual-purpose uplink ports being Media Detect PHYs having a single transceiver and first and second associated connectors where only one connector is active at a time, means for coupling the first associated connector of the first dual-purpose uplink port of S(X) to the first associated connector of the second dual-purpose uplink port of S(X−1), the second associated connector of the first dual-purpose uplink port of S(X) to the second associated connector of the second dual-purpose uplink port of S(X−2), the first associated connector of the second dual-purpose uplink port of S(X) to the first associated connector of the first dual-purpose uplink port of S(X+I) and, the second associated connector of the second dual-purpose uplink port of S(X) to the second associated connector of the first dual-purpose uplink port of S(X+2);

for a first network device S(1) in the stack, means for coupling the second associated connector of the first dual-purpose uplink port as an uplink connector to a next layer in a network hierarchy, and the second dual-purpose uplink port of the first network device in the same way as an interior network device;

for a second network device S(2) in the stack, means for coupling the first associated connector of the first dual-purpose uplink port to the first associated connector of the second dual-purpose uplink port of the first network device S(1), the second associated connector of the first dual-purpose uplink port as the uplink connector to the next layer in the network hierarchy, and the second dual-purpose uplink port of the second network device S(2) in the same way as an interior network device;

for a next to last network device S(N−1) in the stack, means for coupling the first dual-purpose uplink port in the same way as an interior network device, the first associated connector of the second dual-purpose uplink port to the first associated connector of the first dual-purpose uplink port of a last network device S(N) in the stack, and the second associated connector of the second dual-purpose uplink port to the second associated connector of the second dual-purpose uplink port of the last network device S(N);

for a last network device S(N) in the stack, means for coupling the first dual-purpose uplink port in the same way as an interior network device, and the second associated connector of the second dual-purpose uplink port to the second associated connector of the second dual-purpose uplink port of the next to last network device S(N−1); and at each network device, means for configuring the first associated connector of each dual-purpose uplink port as the default and means for forcing the second dual-purpose uplink port to be active if the first associated connector of the first dual-purpose uplink port loses link.

4. The system of claim 3 where the first associated connector is coupled to a copper cable and the second associated connector is coupled to a fiber cable.

5. A fault-tolerant stack comprising:

a plurality of N network devices connected as a stack, where N is a positive integer and with each network device labeled S(X) where X is a positive integer having all values from 1 to N, with each network device having only first and second dual-purpose uplink ports being Media Detect PHYs having a single transceiver and first and second associated connectors where only one connector is active at a time, where;

in each interior network device of the stack, with each interior network device being one of the network devices, S(X), with X having only values greater than or equal to 3 and less than or equal to N−2, the first associated connector of the first dual-purpose uplink port of an interior network device is coupled to the first associated connector of the second dual-purpose uplink port of S(X−1), the second associated connector of the first dual-purpose uplink port of a-n said interior network device is coupled to the second associated connector of the second dual-purpose uplink port of S(X−2), the first associated connector of the second dual-purpose uplink port of a-n said interior network device is coupled to the first associated connector of the first dual-purpose uplink port of S(X+I), and the second associated connector of the second dual-purpose uplink port of a-n said interior network device is coupled to the second associated connector of the first dual-purpose uplink port of S(X+2);

in a first network device S(1) of the stack the first associated connector of the first dual-purpose uplink port is not connected and the second associated connector of the first dual-purpose uplink port is used as the uplink connector to the next layer in a network hierarchy, and the second dual-purpose uplink port of the first network device is connected in the same way as an interior network device;

in a second network device S(2) of the stack the first associated connector of the first dual-purpose uplink port is coupled to the first associated connector of the second dual-purpose uplink port of the first network device S(1), the second associated connector of the first dual-purpose uplink port is not connected, and the second dual-purpose uplink port of the second network device S(2) is connected in the same way as the second dual-purpose uplink port of an interior network device;

in a next to last network device S(N−1) of the stack the first dual-purpose uplink port is connected in the same way as an interior network device, the first associated connector of the second dual-purpose uplink port is coupled to the first associated connector of the first dual-purpose uplink port of a last network device S(N) and the second associated connector of the second dual-purpose uplink port is coupled to the second associated connector of the second dual-purpose uplink port of the last network device S(N);

in the last network device S(N) of the stack, the first dual-purpose uplink port is connected in the same way as an interior network device, the first associated connector of the second dual-purpose uplink port is not connected, and the second associated connector of the second dual-purpose uplink port is coupled to the second associated connector of the second dual-purpose uplink port of the next to last network device S(N−1);

where each dual-purpose uplink port has a management interface and is configured with the first associated connector as default, and automatically switches to the second associated connector if the link to the first associated connector is lost; and where each network device is configured to force the second dual-purpose uplink port to connect to the second associated connector if the first dual-purpose uplink port loses link.

6. The fault-tolerant stack of claim 5 where the first associated connector is coupled to a copper cable and the second associated connector is coupled to a fiber cable.

* * * * *